US009189347B2

(12) United States Patent
Dworakowski et al.

(10) Patent No.: US 9,189,347 B2
(45) Date of Patent: Nov. 17, 2015

(54) HIGH RELIABILITY REDUNDANT VOTING SYSTEM FOR A SIGNAL RECEIVED BY VOTING PROCESSORS IN A COMMUNICATION SYSTEM

(75) Inventors: Waldemar K Dworakowski, Warsaw (PL); Przemyslaw Kryger, Piotrkow Trybunalski (PL); Andrzej Lichnerowicz, Kraków (PL); Robert Mrowiec, Liszki (PL)

(73) Assignee: Motorola Solutions, Inc., Schaumburg, IL (US)

( * ) Notice: Subject to any disclaimer, the term of this patent is extended or adjusted under 35 U.S.C. 154(b) by 116 days.

(21) Appl. No.: 14/235,944

(22) PCT Filed: Jul. 29, 2011

(86) PCT No.: PCT/PL2011/000083
§ 371 (c)(1),
(2), (4) Date: Jan. 29, 2014

(87) PCT Pub. No.: WO2013/019130
PCT Pub. Date: Feb. 7, 2013

(65) Prior Publication Data
US 2014/0173335 A1    Jun. 19, 2014

(51) Int. Cl.
*G06F 11/20* (2006.01)
*H04W 24/04* (2009.01)

(52) U.S. Cl.
CPC ........... *G06F 11/2007* (2013.01); *H04W 24/04* (2013.01)

(58) Field of Classification Search
CPC .. G06F 11/2007; G04W 24/04; G04W 84/08; G04W 4/10; G04W 76/005
See application file for complete search history.

(56) References Cited

U.S. PATENT DOCUMENTS 5,113,413 A * 5/1992 Brown et al. .................. 375/267
5,553,243 A * 9/1996 Harrison et al. .............. 375/224
(Continued)

FOREIGN PATENT DOCUMENTS

EP      1322132 A2     6/2003
EP      1335450 A1     8/2003
(Continued)

OTHER PUBLICATIONS

"Flexible, jitter resistant voting system," IP.Com Electronic publication, Motorola Inc., Jan. 16, 2010, pp. 1-5.
(Continued)

*Primary Examiner* — Nadeem Iqbal
(74) *Attorney, Agent, or Firm* — Daniel R. Bestor

(57) ABSTRACT

Disclosed are methods and systems for providing improved reliability via redundant voting systems. The voting systems are operable to vote on a signal received by a plurality of base stations in a communication system. A first voting processor transmits a message to the plurality of base stations indicating a return base station to voting processor (BS-VP) multicast address. A plurality of multicast messages addressed to the return multicast address are then received from the plurality of base stations and associated with a particular signal received from a signal source by each of the plurality of base stations. The first voting processor determines a recovered signal, and responsive to the first voting processor determining that the second voting processor is no longer operational, transmits the recovered signal to a voting processor to infrastructure (VP-IN) multicast address associated with an infrastructure device and the first and second voting processors.

20 Claims, 6 Drawing Sheets

(56) References Cited

U.S. PATENT DOCUMENTS

| | | | |
|---|---|---|---|
| 5,586,170 A | | 12/1996 | Lea |
| 6,381,466 B1* | | 4/2002 | Sarallo et al. ............... 455/517 |
| 6,418,317 B1* | | 7/2002 | Cuffaro et al. ............... 455/450 |
| 8,817,597 B2* | | 8/2014 | Hall et al. .................... 370/222 |
| 2002/0075824 A1 | | 6/2002 | Willekes et al. |
| 2004/0203807 A1* | | 10/2004 | Bl et al. ...................... 455/450 |
| 2005/0232295 A1* | | 10/2005 | Young ......................... 370/437 |
| 2010/0220656 A1* | | 9/2010 | Ramankutty et al. ........ 370/328 |

FOREIGN PATENT DOCUMENTS

| | | |
|---|---|---|
| EP | 1777893 A1 | 4/2007 |
| EP | 1898656 A1 | 3/2008 |
| EP | 2077688 A2 | 7/2009 |
| WO | 02073882 A2 | 9/2002 |
| WO | 03039032 A1 | 5/2003 |
| WO | 03058847 A1 | 7/2003 |
| WO | 03077356 A2 | 9/2003 |
| WO | 2004004250 A1 | 1/2004 |
| WO | 2004049594 A1 | 6/2004 |
| WO | 2005050899 A2 | 6/2005 |
| WO | 2006024948 A2 | 3/2006 |
| WO | 2009152861 A1 | 12/2009 |

OTHER PUBLICATIONS

International Search Report and Written Opinion for counterpart International Patent Application No. PCT/PL2009/000113 mailed on Oct. 14, 2010.

International Preliminary report on Patentability for counterpart International Application No. PCT/PL2009/000112 issued on Jul. 4, 2012.

International Search Report and Written Opinion for counterpart International Patent Application No. PCT/PL2009/000105 mailed on Aug. 6, 2010.

International Search Report and Written Opinion for counterpart International Patent Application No. PCT/PL2011/000083 mailed on Mar. 2, 2012.

"Improving Mobile and Portable talk-back capability," P25 Digital & Analog Voting, Daniels Electronics Ltd, Jun. 1, 2011, pp. 1-2.

Morris, M., "What is a Voter? An overview of receiver voting systems," accessed at http://www.repeater-builder.comjtech-infojvotingcomparators.html, XP002670026, Jan. 28, 2011, pp. 1-14.

"Motobridge IP Interoperable Solutions Proven mission critical performance you can count on," Motorola Inc., XP007920254, Jan. 1, 2009, pp. 1-4.

\* cited by examiner

HIGH RELIABILITY REDUNDANT VOTING SYSTEM FOR A SIGNAL RECEIVED BY VOTING PROCESSORS IN A COMMUNICATION SYSTEM

FIELD OF THE DISCLOSURE

The present disclosure relates generally to communication systems and more particularly to a high reliability and redundant voting system for voting on a signal received by base stations in a communication system.

BACKGROUND

In some communication systems, a voting processor is provided to support processing of data from multiple input sources. Such voting processors receive data from multiple input sources and determine a best quality data for use in further processing of the received data. Conventional systems use a centralized approach for determining best quality data. One such centralized approach employs a prime site incorporating the voting processor and multiple sub sites for providing data captured at the various sub sites to the prime site. In such systems, each sub site may receive a signal transmitted from a same particular source. However, the data received by each sub site may vary in quality, and the quality at each sub site may vary in time, and therefore the sub sites further forward the received data to the prime site. Upon receipt at the prime site, the voting processor at the prime site processes the incoming data from each of the sub sites to determine best quality data, and perhaps combines data from a plurality of sub sites to create an improved overall data signal better than any single best quality data from a single sub site.

In the centralized approach, a prime site typically employs a single voting processor to process the incoming data from multiple sub sites for determining best quality data. However, in case of failure of (i) the prime site, (ii) network connection(s) between the prime site and the sub sites, and/or (iii) the voting processor itself, the voting system would not be able to determine best quality data and further communications and/or processing may be dropped and/or prevented. Therefore, conventional systems employing a centralized approach of using a single voting processor typically have a single point of failure. Accordingly, there is a need for a solution that would eliminate the single point of failure in communication systems supporting determination of best quality data, and a network structure and communication method to support that solution.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
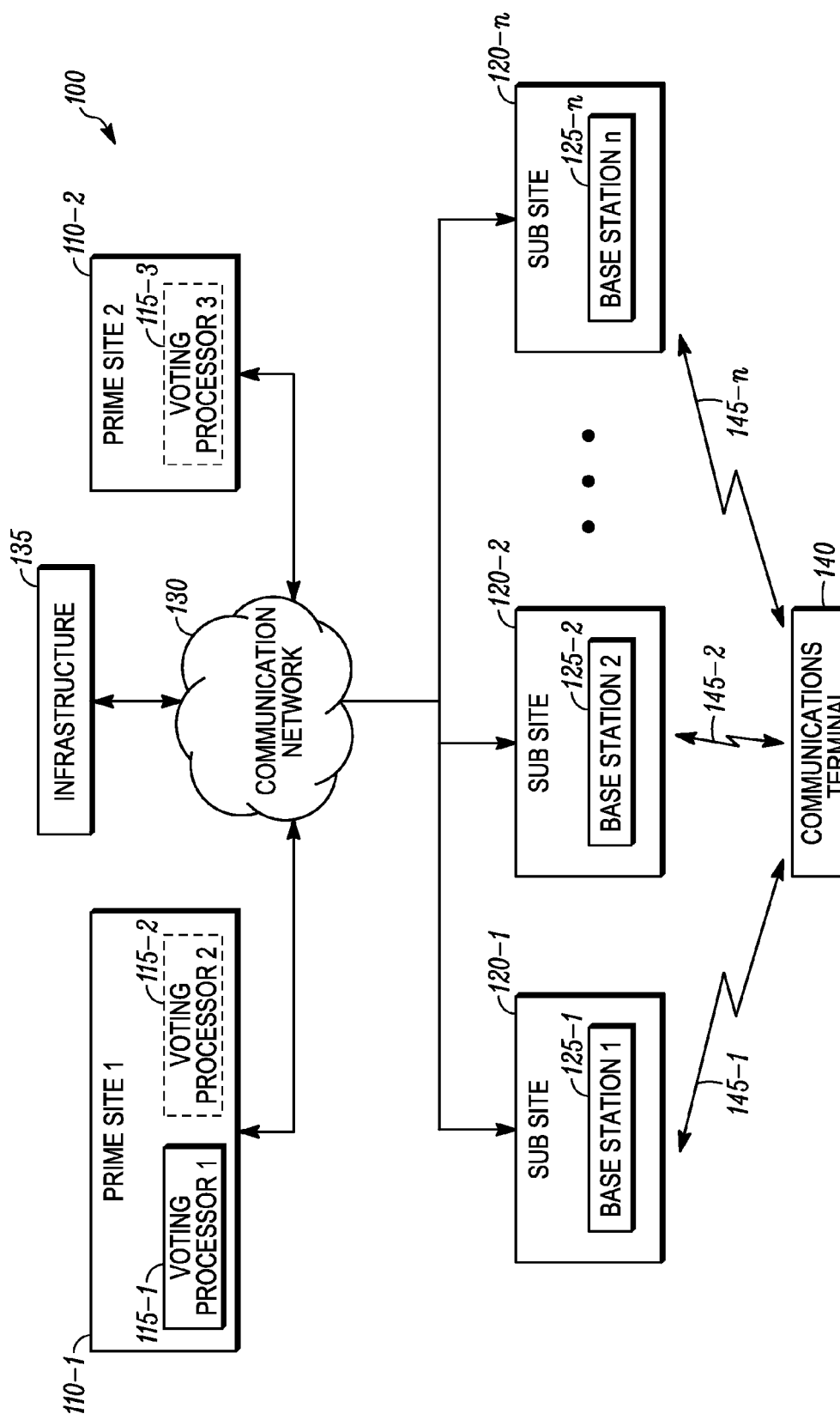
FIG. 1 is a block diagram of a communication system employing a method for providing high reliability and redundant voting systems for voting on a signal received by a plurality of base stations in a communication system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method and apparatus for providing a high reliability and redundant voting system for voting on a signal received by a plurality of base stations in a communication system is provided herein. In operation, a first (active) voting processor transmits a downstream message to a plurality of base stations indicating one or more return base station to voting processor (BS-VP) group address(es) associated with both the first voting processor and a second (backup) voting processor. The plurality of base stations then receive a particular signal transmitted by a signal source, the particular signal including a destination address of one or more target device(s), and transmit corresponding group messages, including source signal information on the particular signal, to the BS-VP group address(es) indicated in the downstream message. The voting processors then receive the corresponding group messages from the plurality of base stations addressed to the BS-VP group address.

The first voting processor then determines a recovered signal, the recovered signal comprising a representation of the received particular signal of at least one of the plurality of base stations having a quality measure better than a quality measure associated with each received particular signal from all other of the plurality of base stations. Then, and in response to the first voting processor determining that the second voting processor is no longer operational, the first voting processor transmits the recovered signal to one or more voting processor to infrastructure (VP-IN) group address(es) associated with an infrastructure device and the first and second voting processors. The infrastructure can then forward the recovered signal to the target device(s).

The first voting processor may determine that the second voting process is no longer operational in a number of different ways consistent with the remainder of this disclosure.

I. Communication System Structures and Devices

FIG. 1 is a block diagram illustrating a communication system 100 employing a method and system for providing a high reliability and redundant voting system for voting on a signal received by a plurality of base stations. The communication system 100 comprises at least one prime site 110-1 in communication with a plurality of sub sites 120-1 through 120-n. In at least one embodiment, additional prime sites such as prime site 110-2 could be used to provide geo-redundancy of voting processors, as will be discussed in more detail later in this disclosure. The communication system 100 further includes an infrastructure 135 that may provide control signals to one or more of the prime sites 110 and/or a gateway to other networks where additional communications terminals (not shown) may be provided for communication to and/or from a signal source such as communications terminal 140.

The infrastructure 135, the prime site(s) 110, and the sub sites 120 may communicate with each other via communication network 130. The communication network 130 may include one or more of private networks, public networks, such as the Internet, wireless networks, such as satellite and cellular networks, local area networks (LANs), wide area networks (WANs), telephone networks, such as the Public Switched Telephone Networks (PSTN), or a combination of networks. Each prime site 110 employs at least one voting processor 115 that is a member of a voting group and is capable of receiving and processing inputs from multiple sources, for example, from multiple sub sites 120-1 through 120-n, to determine best quality data of all the sub sites for further processing. In some communication systems, the voting processor 115 is also referred to as a comparator or a voter. In some embodiments, a single prime site may include more than one voting processor 115, such as voting processors 115-1 and 115-2 in prime site 110-1. In some embodiments, a plurality of prime sites may each include at least one voting processor, such as voting processor 115-1 in prime site 110-1 and voting processor 115-3 in prime site 110-2. In an embodiment not illustrated in FIG. 1, a plurality of prime sites may each include a plurality of voting processors.

Some or all of the voting processors 115 shown in FIG. 1 can be associated with a voting group. As used herein, the term "voting group" refers to a group of voting processors 115 that are configured to communicate and coordinate with each other for selecting a best quality signal among multiple signals received by base stations 125 within the same voting group. The voting processors 115 communicate with each other via communication network 130. After an active one of the voting processors 115 has selected the best quality signal, it may further transmit the best quality signal to one or more target devices (not shown) via the infrastructure 135 and/or communication network 130. The voting processors 115 may be dedicated to one or a particular set of channels (e.g., frequencies, timeslots, etc.) used in the communication system 100, a particular set of communications terminals 140 used in the communication system 100, or some other subset or division of communications in communication system 100. In one embodiment, voting processors 115 may provide voting services to all communications in communication system 100.

Within a single prime site including a plurality of voting processors, such as prime site 110-1, voting processors 115-1 and 115-2 may communicate via a local network (not shown) separate from or coupled to the communication network 130. When geo-redundant configurations are used in which prime sites are located at geographically distinct locations, such as prime sites 110-1 and 110-2, the geographically distinct locations may communicate via a network such as communication network 130.

Each of the plurality of sub sites 120-1 through 120-n employs a base station 125-1 through 125-n to communicate data received from a signal source, for example, communications terminal 140, to the voting processors 115. As used herein, the term "base station" refers to any entity that includes transmitter and/or receiver to perform the functionality of receiving data from a signal source (e.g. communications terminal 140) and transmitting it to another communication unit employing a voting processor (e.g., prime sites 110). For example, the base stations 125 may comprise, among other possibilities, cellular wireless base stations, two-way radio repeaters, receive-only base stations, IEEE 802-based wireless access points, radio-frequency identification (RFID) readers, etc.

The communications terminal 140 communicates with the sub sites 120 and therefore the base stations 125-1 through 125-n via corresponding communication links 145-1 through 145-n. The communication link 145 may be either a wired link or a wireless link. The communications terminal 140 may take the form of a mobile or a fixed terminal. For example, the communications terminal 140 may comprise, among other possibilities, a cellular phone, a two-way radio, and an IEEE 802-based wireless node, an RFID chip, etc.

Further, it is to be understood that the communication system 100 is only a logical representation of connection between an infrastructure 135, a number of sub sites 120-1 through 120-n, and one or more voting processors 115, and thus represents only one possible arrangement of interconnected communications elements. For example, the communication system 100 can be extended to include multiple logical groups of base stations, where each logical group of base stations is connected to a same or different set of one or more voting processors 115. Furthermore, each sub site 120 can include multiple base stations 125, and further one base station 125 from each sub site 120 can be grouped together to form a logical group. In accordance with some embodiments, one of the sub sites 120-1 through 120-n can assume the role of a prime site, thereby replacing a corresponding dedicated prime site 110. In such cases, the particular sub site employs the voting processor 115 and other sub sites forward signals received from the communications terminal 140 to other voting processors 115 at other sub sites 120 via a similar group-addressing scheme as set forth herein.

In accordance with an embodiment, the base stations 125-1 through 125-n receive data, for example, in the form of data packets from the communications terminal 140. In accordance with some embodiments, the data packets identify a stream of data transmitted from a signal source (e.g. communications terminal 140) and received by multiple base stations 125-1 through 125-n, where the particular signal 145-1 through 145-n received by each of the base stations 125 may vary in quality. The quality of data received by each base station 125 may vary due to multiple factors. For example, if the communications terminal 140 is a mobile terminal, then the quality of data transmitted from the communications terminal 140 to each base station 125 may be dependent on the quality of a wireless link between the mobile terminal and the base station, which in turn is dependent on multiple parameters such as coverage area, signal to noise interference, line of sight and the like. Other factors could come into play as well.

Figure 2:
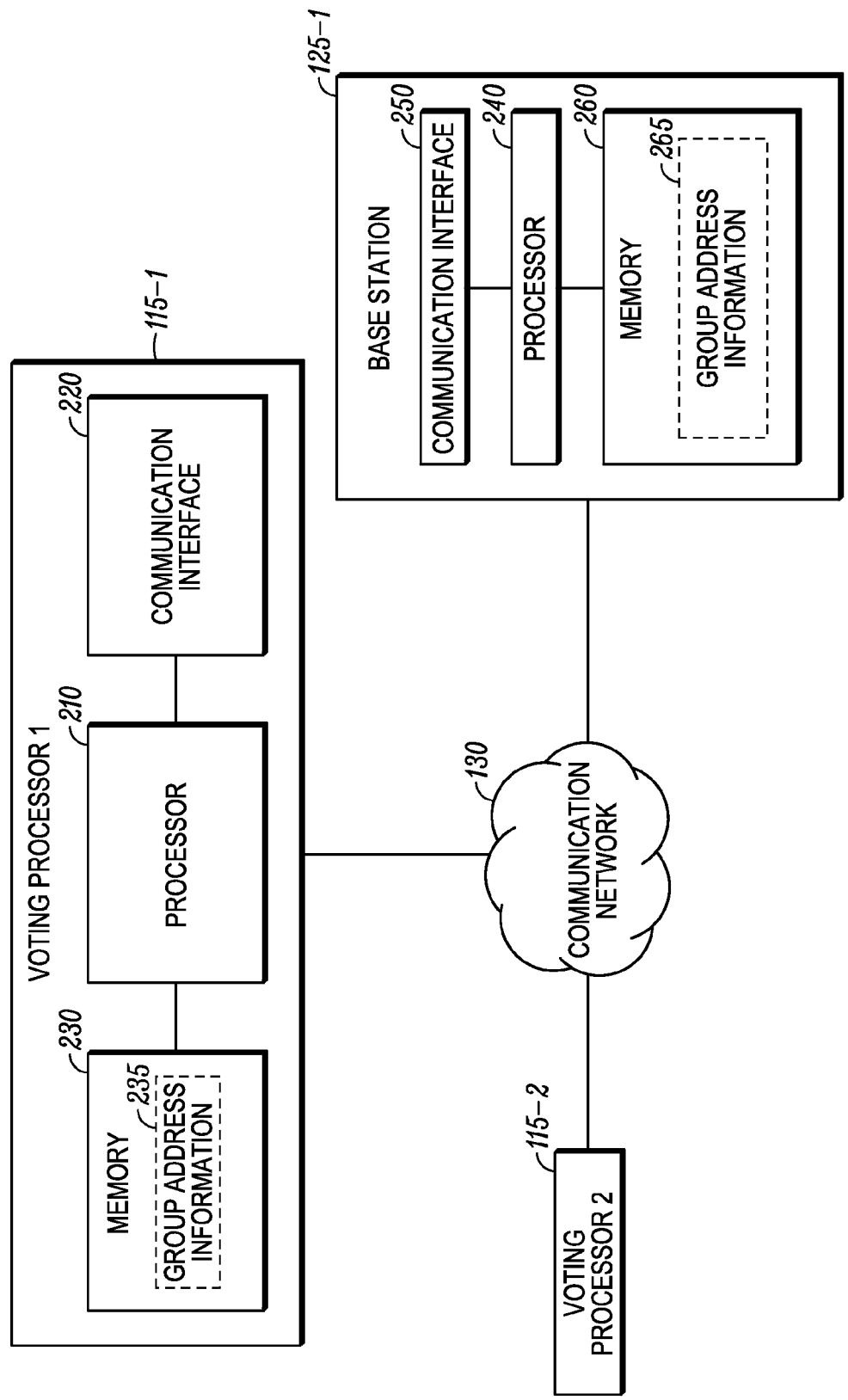
FIG. 2 is a block diagram illustrating further detail of a voting processor and a base station employed in the communication system shown in FIG. 1.

FIG. 2 is a block diagram illustrating further detail of a voting processor 115-1 and a base station 125-1 for operation within the communication system 100 of FIG. 1 in accordance with some embodiments. Although only one voting processor 115-1 and one base station 125-1 are shown in exemplary form in FIG. 2, other voting processors (e.g., 115-2 and 115-3) and other base stations (e.g., 125-2 to 125-n) may have a similar or same structure as that illustrated in FIG. 2.

The voting processor 115-1 includes a processor 210, a communication interface 220, and a memory 230. The base station 125 includes a processor 240, a communication interface 250, and a memory 260. The processors 210, 240 may include one or more microprocessors, microcontrollers, DSPs (digital signal processors), state machines, logic circuitry, or any other device or devices that process information based on operational or programming instructions. Such operational or programming instructions are stored in the memory 230, 260.

The memory 230, 260 can be an IC (integrated circuit) memory chip containing any form of RAM (random-access memory), a floppy disk, a CD-RW (compact disk with read write), a hard disk drive, a DVD-RW (digital versatile disc with read write), a flash memory card, external subscriber identity module (SIM) card or any other medium for storing digital information. One of ordinary skill in the art will recognize that when the processor 210, 240 has one or more of its functions performed by a state machine or logic circuitry, the memory 230, 260 containing the corresponding operational instructions can be embedded within the state machine or logic circuitry.

The communication interface 220, 250 includes appropriate hardware and software architecture in accordance with known techniques that enable communication of data between the voting processor 115-1 and the base station 125-1. The communication interface 250 also enables communication between the base station 125-1 and the communications terminal 140. In accordance with some embodiments, the communication interface 250 may be implemented as a wireless interface for communication with the communications terminal 140 and as a wired interface for communication with the voting processor 115-1. If implemented as a wireless interface, the communication interface 250 includes an antenna (not shown) that comprises any known or developed structure for radiating and receiving electromagnetic energy in the frequency range containing corresponding wireless carrier frequencies.

As illustrated in FIG. 2, the memory 230 stores and maintains group address information 235 for communicating with base stations 125, the infrastructure 135, other voting processors 115, and perhaps other communications system elements. Group address information is address information for addressing a group of (two or more) network elements, such as voting processors 115, base stations 125, and/or infrastructure 135. In an embodiment, group address information may comprise multicast addresses that are used to address a group of two or more network elements simultaneously. For example, the memory 230 may store one or more of (i) a voting processor to infrastructure (VP-IN) multicast address associated with the infrastructure device 135 and the voting processors 115, (ii) an inter-voting-processor (VP) multicast address associated with the voting processors 115, (iii) an infrastructure to voting processor (IF-VP) multicast address associated with the voting processors 115, (iv) a voting processor to base station (VP-BS) multicast address, and (v) a base station to voting processor (BS-VP) multicast address, among other possibilities. Multicast transmissions may be advantageous as they provide an ability to transmit to a selected subset of devices using a signal transmission (reducing network utilization).

In one embodiment, groups of unicast addresses may replace each of the multicast addresses set forth above. For example, instead of using a VP-IN multicast address, a group of unicast addresses that duplicate the functionality of the VP-IN multicast address may be used to reach the infrastructure 135 and voting processors 115. In this way, each network element may store a list of unicast addresses associated with each group, for example, a VP-IN group, and when requested, transmit a plurality of unicast messages to each network element in the list associated with the VP-IN group. In the event that a device locates its own destination address in a list associated with a particular group, it may obviously eliminate the destination address from the list and/or refrain from transmitting a corresponding message to itself. Unicast transmissions may be advantageous as they provide a way to separately address devices in a network, and provide an ability to receive individual acknowledgments for each unicast transmission. Other methods of storing and/or retrieving group addresses could be used as well.

In still another embodiment, broadcast messages could be used in place of multicast or unicast messages, and additional signaling included in each broadcast message to indicate its content and/or its intended recipient. For example, when sending a message to the VP-IN group, a broadcast message may be sent out with a header element or portion of the data payload configured to indicate the VP-IN group as the intended recipient. Voting processors 115 and the infrastructure 135 could then be configured to process the message (e.g., parsing the header and/or data payload information) to determine if they are an intended recipient of the message, and if so, to further process the message. Other network elements could be configured to similarly process the message (e.g., parsing the header and/or data payload information) to determine that they are not an intended recipient of the message, and to refrain from further processing the message. Similar to multicast transmissions, broadcast transmissions may be advantageous as they provide an ability to transmit to a selected subset of devices using a signal transmission (reducing network utilization).

Hereinafter, the term "group address" will be used to refer to a particularly defined group that is addressed in a group-like fashion, independent of the selected underlying mechanism of transmitting messages to that group (e.g., multicast, unicast, or broadcast), and the term "group message" will be used to refer to a message transmitted one or more times (depending on whether multicast, broadcast, or unicast addressing is used) to one or more destination addresses associated with a group address.

Outgoing group messages generated by the voting processor 115-1 may use one or more of the VP-IN, VP, and VP-BS group addresses stored in the memory 230 as destination addresses in generated and transmitted group messages intended for reception by one or more of the infrastructure 135, other voting processors 115, and base stations 125. Voting processor 115-1 may also use one or more of the VP-IN, VP, IF-VP, VP-BS, and BS-VP group addresses stored in the memory to compare against destination group addresses stored in received packets to determine if the voting processor 115-1 is subscribed to the particular group associated with the received group address and/or whether it should further decode the received message (e.g., especially in the case of multicast and broadcast messages). The group address information 235 may be retrieved, stored, and/or set in a number of different ways. For example, address information 235 may be retrieved and/or set via a removable read-only memory (ROM) or electronically programmable read-only memory (EPROM) inserted into the voting processor 115-1 upon manufacture, customer delivery, or at some subsequent point in time. Alternatively or additionally, address information 235 may be electronically updateable and set by processor 210 upon receipt of information from the infrastructure 135, base stations 125, and/or other voting processors 115, or may be set via some other mechanism. Other types of memories and other methods of storing multicast address information 235 could be used as well.

The memory 260 also stores and maintains group address information 265 for communicating with voting processors 115 and perhaps other communications system elements. For example, the memory 260 may store one or more of (i) a VP-BS group address and (ii) a BS-VP group address. Outgoing messages generated by the base station 125-1 may use the BS-VP group address stored in the memory 260 as a destination address for generated and transmitted group messages intended for reception by one or more of the voting processors 115 (e.g., backup and active). Base station 125-1 may use the VP-BS group address stored in the memory 260 to compare against destination addresses stored in received packets to determine if the base station 125-1 is subscribed to the particular group associated with the received group address and/or whether it should further decode the received message (e.g., especially for multicast and broadcast messages). Similar to the group address information 235, the group address information 265 may be retrieved, stored, and/or set in a number of different ways set forth above. For example, group address information 265 may be set via a removable ROM or EPROM inserted into the base station 125-1 upon manufacture, customer delivery, or at some subsequent point in time. Alternatively or additionally, group address information 235 may be electronically updateable and set by processor 240 upon receipt of information from the infrastructure 135, voting processors 115, and/or other base stations 125, or may be set via some other mechanism. Other types of memories and other methods of storing group address information 265 could be used as well.

II. Group-Based Logical Communications

Figure 3:
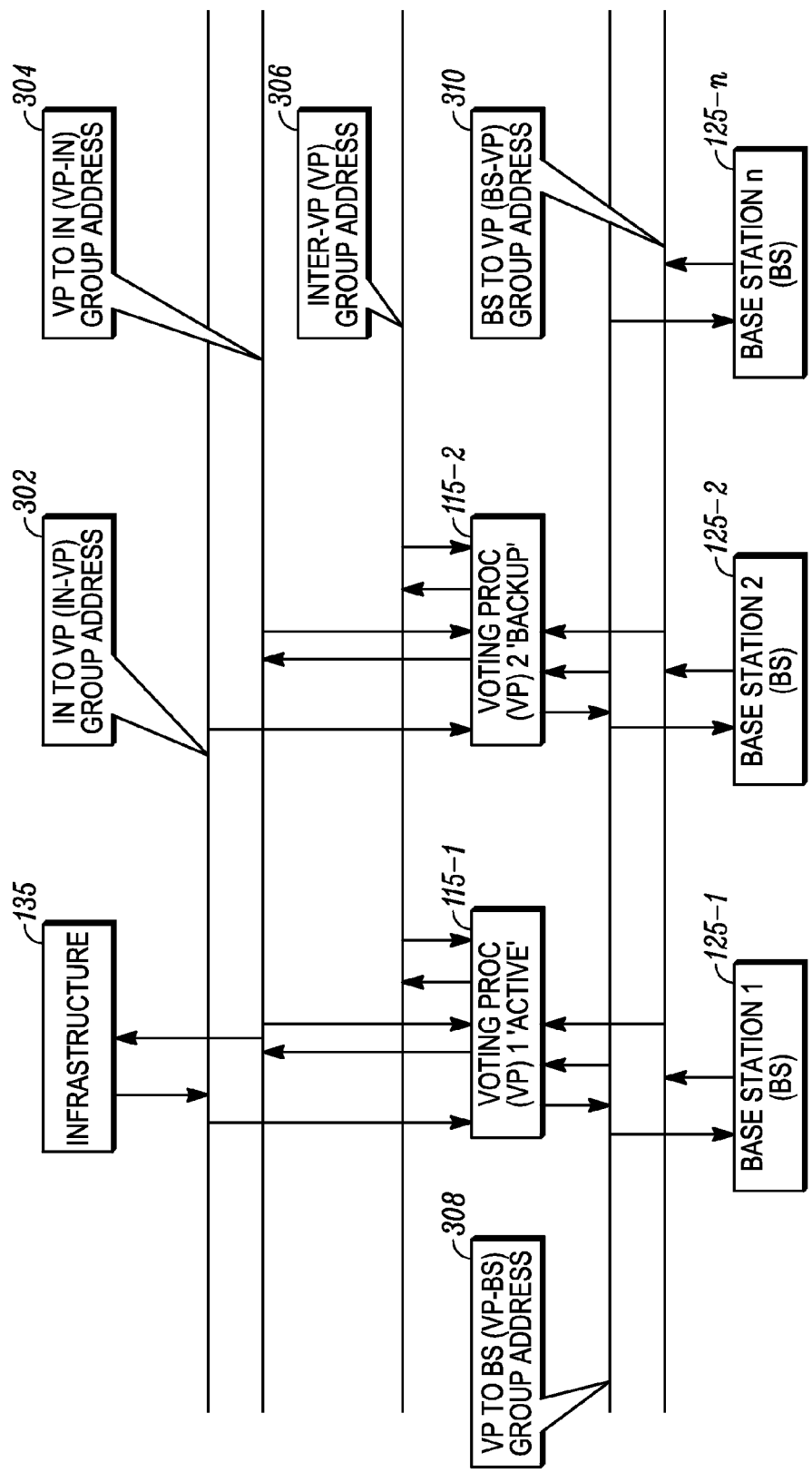
FIG. 3 is a communication diagram illustrating a method of communicating between base stations, voting processors, and infrastructure in accordance with an embodiment.

FIG. 3 is a logical connection diagram illustrating the various possible group address links in the communication system 100 of FIG. 1, including the IN-VP group address 302, the VP-IN group address 304, the VP group address 306, the VP-BS group address 308, and the BS-VP group address 310. Between the infrastructure 135 and the voting processors 115, the IN-VP group and associated IN-VP group address 302 facilitate communications from the infrastructure 135 to each of a plurality of voting processors (such as two or more of voting processors 115-1, 115-2, and 115-3 in FIG. 1). In one embodiment, only one of the voting processors 115-1 to 115-3 is an active voting processor, and only one of the voting processors 115-1 to 115-3 is a backup voting processor (taking over for the active voting processor only when it detects a failure of the active voting processor to take an expected action). In other embodiments, there may be more than one active voting processor at a time (perhaps for load balancing purposes based on some algorithm known in the art), and/or there may be more than one backup voting processor at a time (perhaps all participating as backup voting processors in parallel and duplicating the processing of the active voting processor, or perhaps only coming online as a backup voting processor when another backup voting processor steps in for a failing active voting processor, among other options). In any event, the IN-VP group address 302 is stored at each voting processor 115 and is used by the infrastructure 135 to multicast messages to each of the plurality of voting processors 115, whether acting as an active voting processor or a backup voting processor.

Also between the infrastructure 135 and the voting processors 115, the VP-IN group and associated VP-IN address 304 facilitate communications from a particular voting processor, such as voting processor 115-1, to other voting processors (such as one or more of voting processors 115-2 and 115-3) and to infrastructure 135. The VP-IN group address 304 may be used by an active voting processor, such as voting processor 115-1, to transmit a recovered signal (e.g., a signal having a quality measure better than a quality measure associated with each received particular signal from all other of the plurality of base stations) to the infrastructure 135. Backup voting processors, such as voting processor 115-2, may also function to monitor the VP-IN group address for expected communications from the active voting processor 115-1 to the infrastructure 135. For example, if the backup voting processor 115-2 does not receive a recovered signal transmitted from the active voting processor 115-1 to the infrastructure 135 within a maximum period of time from when it expects to see such a transmission, the backup voting processor 115-2 may make a determination that the active voting processor 115-1 is not functioning, designate itself as the active voting processor, and transmit the recovered signal to the infrastructure 135 (e.g., via the VP-IN group address) in place of voting processor 115-1.

Between the voting processors 115, the inter-voting-processor (VP) group and associated VP group address 306 may be used to coordinate functions and transmit information between voting processors 115. For example, and as another method of detecting a failing voting processor, one or more backup voting processors (for example, voting processor 115-2) may intermittently or periodically transmit a status message, such as a ping message, to the VP group address 306. Active and backup voting processors may then respond to the status message with status information. The status information may include their operating status (e.g. active, backup, fail-mode, etc.), location, and/or other information (e.g. hardware address, serving base stations, processing load, etc.). If a backup voting processor expects a response via the VP group address from a known active voting processor and does not receive one within a maximum period of time, it may determine that the active voting processor (or active voting processors, if more than one) is failing and may take corrective action consistent with this disclosure. The VP group address 306 may also be used to exchange visibility lists with other voting processors 115, setting forth and identifying the base stations 125 that each voting processor is able to communicate with. The visibility lists may then be used to determine if there are any network problems and/or to determine which one or more of the voting processors 115 should initially be active and which one or more of the voting processors 115 should initially be backup. Other uses of the VP group address are possible as well.

Between the voting processors 115 and base stations 125 are the VP-BS group address 308 and the BS-VP group address 310. The VP-BS group and associated VP-BS group address 308 may be used by one or more of the voting processors 115 to transmit messages to base stations 125 to, for example, generate a visibility list setting forth those base stations 125 that each voting processor 115 can communicate with. Backup voting processors may also monitor the VP-BS group address 308 to ensure that communications from an active voting processor occur within an expected period of time so that, if they don't, one of the one or more backup voting processors can step in and take over for a failing active voting processor. Other uses are also possible. The BS-VP group and associated BS-VP group address 310 may be used by the base stations 125 to transmit information corresponding to a particular signal transmitted by a signal source (such as communications terminal 140) and received at each corresponding base station in the group. By using the BS-VP group address 310, each base station 125 can transmit the particular source signal information to both active and backup voting processors in a single (multicast/broadcast) transmission or in multiple (unicast) transmissions.

Although a number of group addresses 302-310 are illustrated in FIG. 3, not every embodiment in the disclosure requires each one of the group addresses illustrated. Rather, only those group addresses set forth below with respect to particular embodiments and functions may be required in any one particular embodiment.

III. Operational Examples

Figure 4:
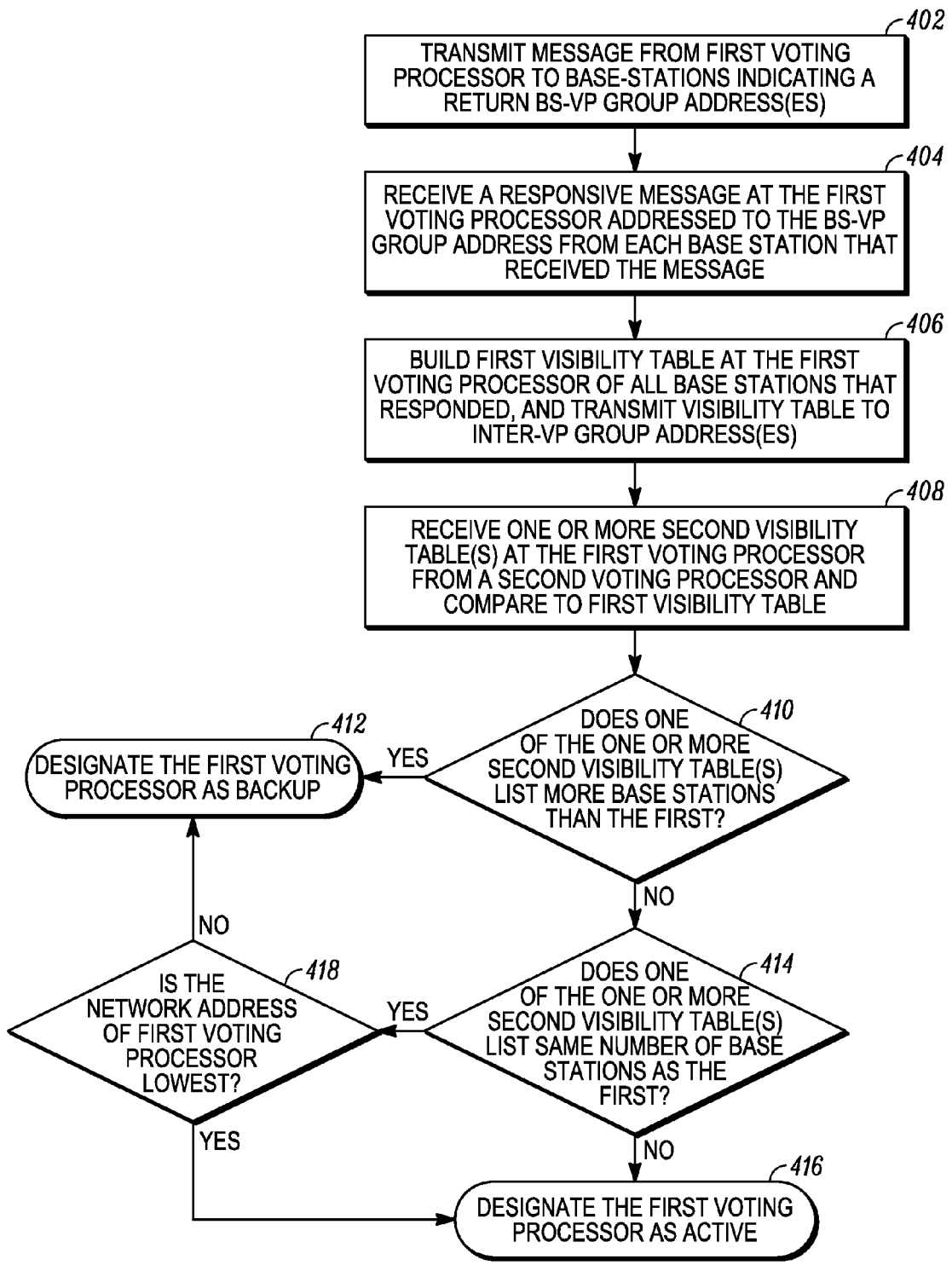
FIG. 4 is a flow chart illustrating an example of voting processors automatically determining their own active or backup status in accordance with an embodiment.

FIG. 4 sets forth a flowchart illustrating a method 400 of operation by voting processors 115 for automatically determining an active and backup status in accordance with an embodiment. Method 400 may be executed at each voting processor 115 upon initial power-on, upon a new voting processor 115 being added to the communication system 100, periodically (e.g., hourly, weekly, monthly, etc.), intermittently (e.g., in response to a trigger from infrastructure 135, base station 125, or another voting processor 115), or at some other time. While the method 400 is described as executing at a first voting processor (e.g., voting processor 115-1), it should be understood that the method 400 may be executed in parallel at each voting processor in a voting group. Furthermore, for ease of reference in describing the operational examples in FIGS. 4-6, the first voting processor will be designated an active voting processor and the second voting processor will be designated a backup voting processor. Notwithstanding the foregoing, and while only a single first (active) voting processor and single second (backup) voting process is used in the following description, it should be understood that more than one active voting processor may be provided in some embodiments (for example, for load balancing purposes, etc.) and that more than one backup voting processor may be provided (for example, for additional redundancy and/or load balancing purposes).

At step 402, the first voting processor transmits a message to the VP-BS group address including an identifier of a return BS-VP group address. At step 404, the first voting processor receives a response from each base station that received the message transmitted in step 402, assuming an existing and/or operable network connection exists between a particular one of the base stations 125 and the first voting processor. At step 406, the first voting processor builds its own first visibility table setting forth each of the base stations 125 that responded to the message transmitted in the step 402. At step 408, the first voting processor transmits its own first visibility table to the VP group address, and the first voting processor receives at least one second visibility table from another voting processor in the group. In the example of FIG. 1, and assuming only voting processors 115-1 and 115-3 have been placed into service, voting processors 115-1 and 115-3 may exchange their visibility tables via messages transmitted to one another through communication network 130 (and perhaps via the VP group address).

At step 410, the first voting processor determines whether any one of one or more received second visibility tables lists more base stations than the locally generated first visibility table. If at least one second visibility table does list more base stations than the first visibility table, processing proceeds to step 412. At step 412, the first voting processor designates itself as a backup voting processor, as at least one other voting processor in the voting group has better visibility. Returning to step 410, if none of the received second visibility tables lists more base stations than the first visibility tables, processing proceeds to step 414.

At step 414, the first voting processor determines whether one or more of the received second visibility tables lists an equal number of base stations as the locally generated first visibility table. If there are no received second visibility tables that list an equal number of base stations as the locally generated first visibility table, processing proceeds to step 416. At step 416, the first voting processor designates itself as an active voting processor as it has a base station visibility greater than any other voting processors in the voting group.

Returning to step 414, if on the other hand, there are received second visibility tables that list an equal number of base stations as the locally generated first visibility table, processing proceeds to step 418. At step 418, additional arbitration algorithms must be used to determine which voting processor(s) is active and which voting processor(s) is backup. In one example, the value of the network IP address of the voting processors may be used to further arbitrate voting processor status. For example, at step 418, the first voting processor may determine whether it has the lowest network IP address among the other voting processors (information which may have been included in the second visibility tables, or provided separately by the voting processors to the VP group address). If the first voting processor determines that it has the lowest network IP address in the voting group, processing proceeds to step 416 where the first voting processor designates itself as an active voting processor. On the other hand, if the first voting processor determines that it does not have the lowest network IP address in the voting group, processing proceeds to step 412 where the first voting processor designates itself as a backup voting processor. Of course, other types of arbitration methods could be used at step 418, such as highest IP address, lowest maximum latency of connections between voting processors and base stations, minimum processing load, and maximum available processing resources, among other possibilities.

In one embodiment, and in accordance with method 400, only one voting processor in a voting group is designated an active voting processor, while the remaining voting processors are designated backup voting processors. In the event that there are more than one backup voting processor, and the voting processor designated active in accordance with method 400 becomes unresponsive, the method 400 may be re-executed by the remaining backup voting processors to determine which backup voting processor is to become newly active first. In another embodiment, and during the method 400 executed at each voting processor in the voting group, each backup voting processor may determine and store its place in line with respect to the other backup voting processors in the group to determine when it should take over from a non-functioning active voting processor without having to re-execute method 400. This way, at step 410, a backup voting processor may determine and store how many other voting processors sent a second visibility table having more base stations listed than the first locally generated visibility table, and use this information in determining its place in line. For example, if two other backup voting processor (besides the active voting processor) have larger visibility tables than the first voting processor, the first voting processor may determine that it will delay taking over for a non-functioning active voting processor until it determines that the two other backup voting processors have either failed to take over for the failing active voting processor, or have they themselves taken over and then subsequently become non-functioning. Other possibilities exist as well.

While in one embodiment only one voting processor in a particular voting group is determined to be active at a time, in other embodiments, more than one voting processor may be active at a time, perhaps for load-balancing or other purposes. In this scenario, other algorithms are instituted to ensure that only one active voting processor sends out a final recovered signal and/or performs some other active voting processor function at a time, or logic may be added to network elements such as the infrastructure 135 and/or the base stations 125 to eliminate duplicate messages produced by the voting processors. In one example, each active voting processor in the plurality may operate in a round-robin fashion and process every other, every third, every fourth, etc. signal received from the base stations 125. In another embodiment, the one of the active voting processors elected to process a signal from a signal source may depend on which base station is first to send a corresponding particular signal on whether the base station has an odd or even network address, or some other consideration. Other examples are possible as well.

Assuming that method 400 has been executed successfully and the first voting processor in the voting group determined to be an active voting processor and the second voting processor in the voting group determined to be a backup voting processor, method 500 in FIG. 5 may subsequently be executed by the first and second voting processors. At step 502, the first (active) voting processor transmits a message to the base stations indicating a return BS-VP group address associated with the first and second voting processors. At step 504, the first and second voting processors receive a plurality of group messages, associated with a particular signal received at the base stations 125 from a signal source (such as communications terminal 140), via the BS-VP group address. The particular signal may be, for example, a data, control, or voice packet addressed to a target device. At step 506, the first and second voting processors determine a recovered signal in parallel. The recovered signal may represent a best signal received from a particular one of the plurality of base stations that transmitted a group message in step 504, or a resultant signal generated based on operations performed on two or more group messages received from two or more base stations with respect to a same particular signal transmitted by the signal source. Other possibilities exist as well.

At step 508, the second voting processor determines if the first voting processor is operational (e.g., functioning as expected). The second voting processor may determine that the first voting processor is not operational in a number of different ways. In one example, the second voting processor may determine that the first voting processor is not operational in response to the first voting processor failing to transmit the recovered signal to the VP-IN group address within a maximum voting window period of time. For example, the maximum voting window period of time can be pre-defined at all voting processors in the group, and may be calculated based on an expected delay time for each voting processor to determine a recovered signal, and a particular delay time in transmitting the resultant recovered signal, perhaps plus or minus some additional arbitrary period of time. In one example, the voting window time period may be measured to be 5 ms-500 ms after a last multicast message is received from the base stations with respect to a particular signal source transmitted by a source device, or perhaps between 10 ms and 150 ms.

As another method of detecting a failing voting processor at step 508, the second voting processor may intermittently or periodically transmit a status message, such as a ping message, to the VP group address of which the first voting processor is a member and/or directly to the first voting processor. If the second voting processor expects a response to the ping message from the first voting processor and does not receive one within a maximum period of time, such as 5 ms-500 ms or 10 ms-150 ms, the second voting processor may determine that the first voting processor is failing.

If the second voting processor detects a transmission of the recovered signal from the first voting processor, or otherwise determines that the first voting processor is not failing, processing continues to step 510 in which the second voting processor refrains from transmitting its own determined recovered signal to the infrastructure.

On the other hand, if the second voting processor determines, consistent with the foregoing, that the first voting processor is failing or no longer operational, processing may continue to step 512 where the second voting processor steps in for the failing first voting processor and transmits its own determined recovered signal to the infrastructure via the VP-IN multicast address.

In one embodiment, the second voting processor may also determine that the first voting processor is failing or no longer operational if, even though it receives a determined recovered signal from the first voting processor, the recovered signal received from the first voting processor is of significantly lower quality than the signal the second voting processor is going to transmit. A threshold level of quality difference may have to be met (for example, 25% worse, 50% worse, or 75% or more), and/or a number of recovered signals received falling below the threshold level of quality difference, before the second voting processor determines that the first voting processor may be failing and begins transmitting its own determined recovered signal. Furthermore, in this case, the infrastructure 135 would need to be able to eliminate the duplicate packet (in this case, the determined recovered signal transmitted by the first voting processor) and keep the improved determined recovered signal transmitted by the second voting processor, consistent with the method of eliminating duplicate packets discussed further herein.

Figure 5:
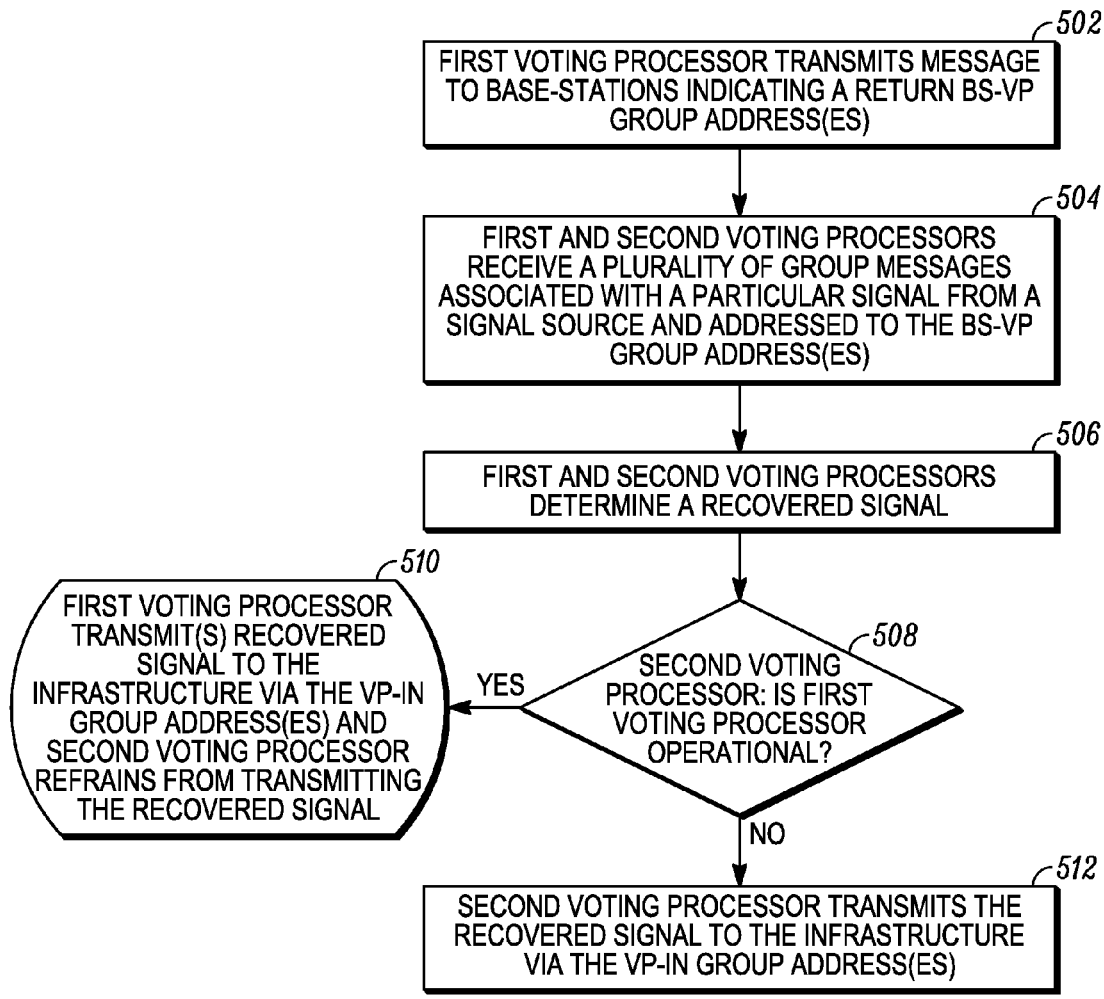
FIG. 5 is a flowchart illustrating a method for a backup voting processor to monitor group communications and compensate for a failed active voting processor, in accordance with an embodiment.

Although FIG. 5 illustrates a method of providing a second voting processor with respect to base station to infrastructure communications, the same or similar methods and processes can be applied to infrastructure to base station communications. For example, in the event that the infrastructure transmits a message to the first and second voting processors via the IN-VP group address for further transmission to the base stations, and in response to the second voting processor failing to detect a corresponding transmission from the first voting processor to the VP-BS group address within the predetermined maximum period of time, the second voting processor may step in and transmit the message to the VP-BS group address on its own.

In either of the scenarios set forth above, once a backup voting processor has detected a failing or inoperational active voting processor and takes steps to replace the active voting processor, the backup voting processor may continue to execute functions that would normally be executed by the active voting processor until the backup processor detects, or is told, that the failing or inoperational active voting processor has come back online and/or is no longer failing. For example, the backup voting processor taking over the functionality of the active voting processor may continue to periodically or intermittently ping the failing or inoperational active voting processor (perhaps via a message sent to the VP group address or a unicast message sent directly to the failing or inoperational active voting processor) and, responsive to receiving a response from the failing or inoperational active voting processor in the future indicating that it is now operational, refrain from taking over the functionality of the active voting processor until it again detects that the active voting processor has failed or become inoperational.

Figure 6:
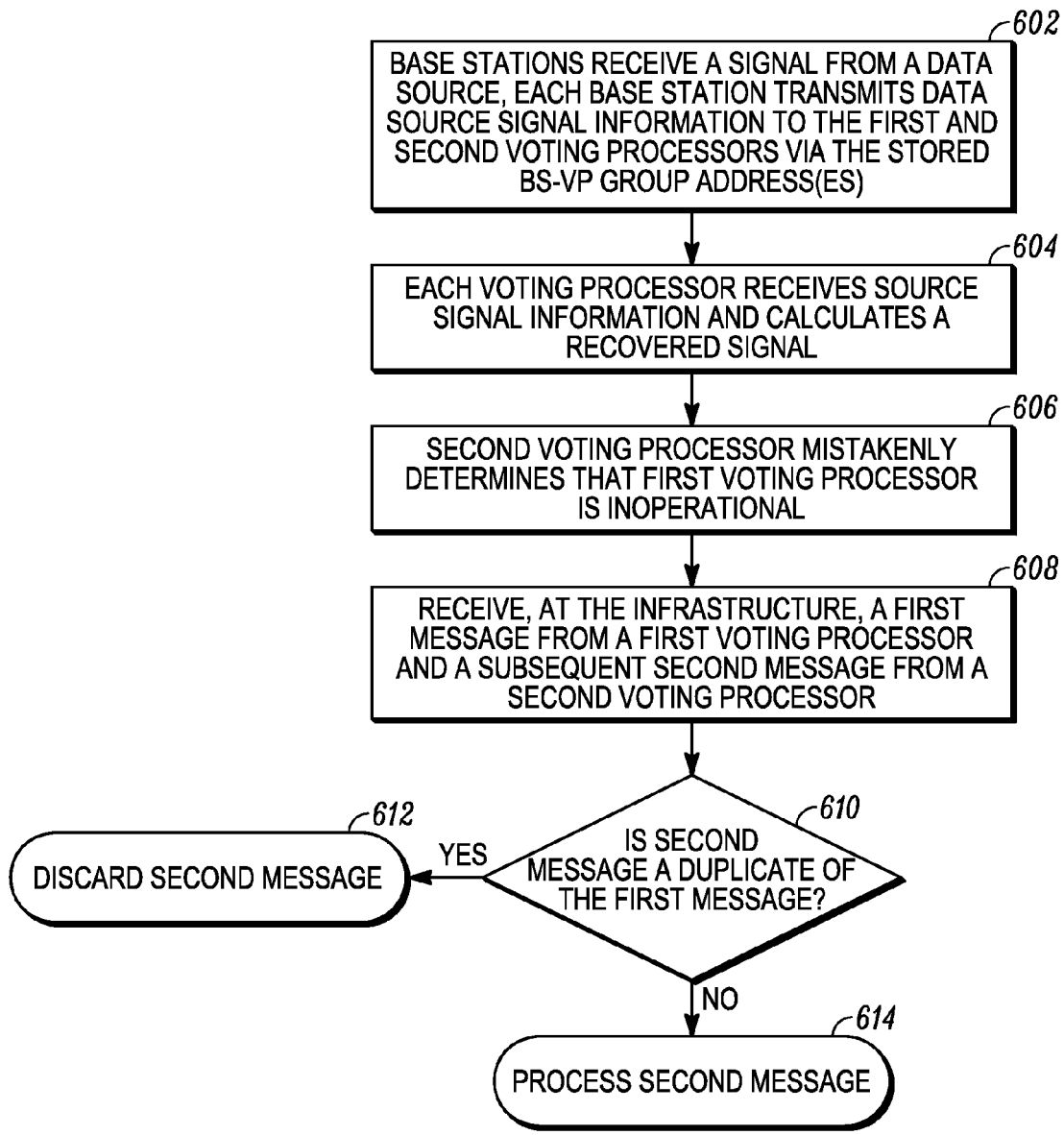
FIG. 6 is a flowchart illustrating a method for an infrastructure or base station to communicate with active and backup voting processors, and to eliminate duplicate messages in an instance where a backup voting processor mistakenly transmits a message, in accordance with an embodiment.

In the event that a backup voting processor mistakenly determines that the active voting processor has started to fail or become inoperational, or for any other reason already set forth above, it is possible that one or more of the infrastructure 135 and/or the base stations 125 receive duplicate messages from the active and backup voting processors. FIG. 6 sets forth a method 600 for compensating for this possibility. While FIG. 6 uses the example of an infrastructure 135 receiving a duplicate message from the first (active) and second (backup) voting processors, the same or similar method can be applied at the base stations 125 to eliminate duplicate messages from the first and second voting processors. Other devices in the network could operate to eliminate duplicate messages as well, and duplicate messages from more than two devices could also be eliminated using a same method.

At step 602, the base stations 125 receive a signal from a signal source and each transmit corresponding source signal information to the first and second voting processors via a stored BS-VP group address. At step 604, each of the first and second voting processors receives source signal information from respective base stations, and calculates its own recovered signal from the source signal information (and perhaps via communications with each other as well). At step 606, the second voting processor mistakenly determines that the first voting processor has become inoperational (e.g., perhaps by failing to detect a recovered signal transmission from the first voting processor to the infrastructure within a maximum period of time after the second voting processor receives the source signal information from the respective base stations, or for some other reason).

At step 608, because the second voting processor mistakenly believes that the first voting processor is failing, when in fact the first voting processor is not failing and has already sent its own recovered signal to the infrastructure, the infrastructure receives not only the recovered signal sent by the first voting processor, but also a second recovered signal sent by the second voting processor. Without changes to the infrastructure, the receipt of duplicate messages from multiple voting processors could cause an unrecoverable error to occur at the infrastructure. In order to prevent such an occurrence, the infrastructure logic is modified to detect and eliminate duplicate messages sent by multiple voting processors.

At step 610, the infrastructure determines whether the second message including the recovered signal sent from the second voting processor (e.g., after the maximum period of time has passed) is a duplicate of the first message including the recovered signal sent from the first voting processor. While the messages may not be duplicates in the sense they contain exactly the same payload and header information, etc., they may be duplicates in the sense that they include duplicate payloads (e.g., information on the recovered signal that has already been sent by the other voting processor). The infrastructure can make a duplicate determination in a number of ways. In one example, the base stations create a time stamp when the receive and/or decode the particular signal from the signal source, and include the time stamp in the subsequent source signal information messages transmitted to the voting processors. The voting processors can then include the time stamp information (e.g., the time stamp included in a first message received from a base station including the source signal information, the time stamp included in a last message received from a base station including the source signal information, an average time stamp across all messages received from base stations including the source signal information, the time stamp of the source signal information from the base station indicating a highest quality, or some other method) in their subsequent transmission of a recovered signal to the infrastructure. The infrastructure can then compare the time stamps included along with the recovered signal and, if identical or within a pre-determined range of one another, determine that the recovered signals included in the first and second messages are duplicates. In one example, the pre-determined range may be between 0 and 50 ms, in another example, the pre-determined range may be between 0 and 5 ms, and in another example, may be between 0 and 5 μs.

In addition, an identity of the signal source, such as a network address or hardware ID associated with the signal source, may also be provided to and compared by the infrastructure to ensure that the duplicate message is from a same signal source and within the pre-determined time range. Other examples are possible as well. Any number of ways to synchronize times between network devices may be used to ensure comity amongst devices. For example, all devices may sync their clocks to a GPS NTP signal, and/or with a central time distribution system, perhaps when GPS is not available.

In one embodiment, and in addition or in place of using time stamps, the infrastructure may look to the quality of the signal information included within the duplicate messages, and choose to eliminate the duplicate packet with the lower quality. For example, in the case discussed above where a failing active voting processor is sending out determined recovered signals having a worse quality than a backup voting processor (that perhaps has already detected the failing first voting processor and is intentionally transmitting the duplicate second packet with improve signal quality information), the infrastructure may be configured to eliminate the duplicate packet from the first voting processor, perhaps in place of or in addition to consideration of the time stamps.

In the opposite direction, a time stamp may be included by the infrastructure in any transmissions intended for one or more of the base stations, and passed on by the voting processors, so that the base stations may similarly compare time stamps (first, last, average, etc.) and/or a network or hardware ID within the packet to determine whether a second message received from the voting processors is a duplicate of a first message. In another embodiment, the voting processors themselves may attach a time stamp to a message received from the infrastructure prior to passing the message on to the base stations. The base stations may then similarly eliminate duplicate messages using the time stamps attached by the voting processors. Other possibilities exist as well.

Returning to FIG. 6, if the infrastructure determines at step 610 that a second message received from the second (backup) voting processor is indeed a duplicate of a first message already received from the first (active) voting processor, the infrastructure proceeds to step 612 and discards the second duplicated message (or, in some embodiments, the first duplicated message). On the other hand, if the infrastructure determines at step 610 that the second message is not a duplicate of a first message already received from the first (active) voting processor, the infrastructure proceeds to step 614 and processes the second message.

While in the method 600 set forth in FIG. 6, the situation in which voting processors send duplicate messages is viewed as an undesired side effect of the second (backup) voting processor mistakenly believing that the first (active) voting processor is inoperational, there may be situations in which we desire the first and second voting processors to transmit duplicate packets, even when the first voting process is fully operational and the second voting processor knows as much. For example, in what is commonly referred to as a "split horizon" situation in which the second voting processor can see a set of base stations that is not a superset or subset of the base stations that the first voting processor can see (e.g., there is at least one base station visible to the first voting processor that is not visible to the second, and vice versa), it may be desirable for the voting processors to transmit duplicate packets to the VP-BS group address to ensure that all base stations in the voting group receive the messages that they are intended to receive.

As set forth above, the voting processors may exchange visibility lists via the VP group address. When comparing visibility lists, the first and second voting processors may determine that such a split horizon situation exists and be configured to, in response, transmit duplicate packets on the downstream to the base stations whenever requested to do so, relying upon the base stations appearing in both visibility lists to properly eliminate received duplicate messages, perhaps based on time stamps inserted by the infrastructure and/or the voting processors.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, or article that comprises, has, includes, contains a list of elements does not include only those elements but may include other elements not expressly listed or inherent to such process, method, or article. An element proceeded by "comprises . . . a", "has . . . a", "includes . . . a", "contains . . . a" does not, without more constraints, preclude the existence of additional identical elements in the process, method, or article that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for providing a redundant voting system for voting on a signal received by a plurality of base stations in a communication system, the method comprising:
   a first voting processor transmitting a downstream message to a plurality of base stations indicating a return base station to voting processor (BS-VP) group associated with the first voting processor and a second voting processor;
   receiving a plurality of group messages addressed to the return group from the plurality of base stations and associated with a particular signal received from a signal source by each of the plurality of base stations, the particular signal including an address of a target device to which the particular signal is directed;
   the first voting processor determining a recovered signal, wherein the recovered signal comprises a representation of the received particular signal of at least one of the plurality of base stations having a quality measure better than a quality measure associated with each received particular signal from all other of the plurality of base stations; and
   responsive to the first voting processor determining that the second voting processor is no longer operational, the first voting processor transmitting the recovered signal to a voting processor to infrastructure (VP-IN) group associated with an infrastructure device and the first and second voting processors.

2. The method of claim 1, wherein the first voting processor determining that the second voting processor is no longer operational comprises the first voting processor determining that the second voting processor has failed to transmit the recovered signal to the VP-IN group.

3. The method of claim 1, wherein the first voting processor is a backup voting processor disposed at a geographically disperse location relative to the second voting processor.

4. The method of claim 1, further comprising the first voting processor transmitting the received particular signal of the at least one of the plurality of base stations having the quality measure better than a quality measure associated with each received particular from all other of the plurality of base stations to an inter-voting-processor (VP) group associated with the first and second voting processors.

5. The method of claim 4, wherein the first voting processor determining that the second voting processor is no longer operational comprises the first voting processor determining that it has failed to receive from the second voting processor, via the VP group, a corresponding recovered signal calculated by the second voting processor.

6. The method of claim 1, further comprising the first voting processor monitoring an infrastructure to voting processor (IF-VP) group for messages directed to base stations and, responsive to detecting that the second voting processor has failed to further transmit a particular infrastructure message transmitted by the infrastructure to the IF-VP group to the base stations via a voting processor to base station (VP-BS) group, the first voting processor transmitting the particular infrastructure message to the base stations via the VP-BS group.

7. The method of claim 1, further comprising the first voting processor transmitting a first visibility table to the second voting processor indicating a first set of base stations visible to the first voting processor, and the first voting processor receiving a second visibility table from the second voting processor indicating a second set of base stations visible to the second voting processor.

8. The method of claim 7, further comprising, responsive to determining that the second visibility table from the second voting processor indicates a higher number of base stations in the second set visible to the second voting processor compared to a number of base stations in the first set visible to the first voting processor, designating the second voting processor an active voting processor for at least one particular base station channel and designating the first voting processor a backup voting processor for at least the one particular base station channel.

9. The method of claim 7, further comprising, responsive to determining that the second visibility table from the second voting processor indicates a same number of base stations in the second set visible to the second voting processor compared to a number of base stations in the first set visible to the first voting processor, comparing a network address of the first voting processor and second voting processor and responsive to determining that the second voting processor has one of a higher and a lower network address than the first voting processor, designating the second voting processor an active voting processor for at least one particular base station channel and designating the first voting processor a backup voting processor for at least the one particular base station channel.

10. The method of claim 1, further comprising the infrastructure providing the recovered signal to the target device.

11. The method of claim 1, further comprising one of (i) the infrastructure and (ii) one of the base stations eliminating a duplicate packet transmitted by one of the first and second voting processors due to one of (i) an erroneous determination that the other of the one of the first and second voting processors is no longer operational and (ii) a determination that the other of the one of the first and second voting processors is sending out lower signal quality information.

12. The method of claim 1, the first voting processor transmitting the recovered signal to the VP-IN group associated with the infrastructure device and the first and second voting processors comprises one of (i) the first voting processor transmitting the recovered signal to a VP-IN multicast address associated with the infrastructure device and the first and second voting processors, (ii) the first voting processor transmitting the recovered signal to a broadcast address and including information in one of a header and payload indicating the infrastructure device and the first and second voting processors as intended recipients, and (iii) the first voting processor retrieving a list of unicast addresses associated with members of the VP-IN group and transmitting the recovered signal to the each of the infrastructure device and the first and second voting processors via a plurality of respective unicast transmissions to the unicast addresses in the list.

13. A communication system for providing a redundant voting processors for voting on a signal received by a plurality of base stations in a communication system, the communication system comprising:
  a first voting processor configured to:
    transmit a message to a plurality of base stations indicating a return base station to voting processor (BS-VP) group associated with the first voting processor and a second voting processor;
    receive a plurality of group messages addressed to the return group from the plurality of base stations and associated with a particular signal received from a signal source by each of the plurality of base stations, the particular signal including an address of a target device;
    determine a recovered signal, wherein the recovered signal comprises a representation of the received particular signal of at least one of the plurality of base stations having a quality measure better than a quality measure associated with each received particular signal from all other of the plurality of base stations; and
    responsive to making a determination that the second voting processor is no longer operational, transmit the recovered signal to a voting processor to infrastructure (VP-IN) group associated with an infrastructure device and the first and second voting processors.

14. The communication system of claim 13, wherein the first voting processor is configured to make the determination that the second voting processor is no longer operational by determining that the second voting processor has failed to transmit the recovered signal to the VP-IN group.

15. The communication system of claim 13, wherein the first voting processor is a backup voting processor disposed at a geographically disperse location relative to the second voting processor.

16. The communication system of claim 13, wherein the first voting processor is further configured to transmit the received particular signal of the at least one of the plurality of base stations having the quality measure better than a quality measure associated with each received particular signal from all other of the plurality of base stations to an inter-voting-processor (VP) group associated with the first and second voting processors.

17. The communication system of claim 16, wherein the first voting processor is configured to determine that the second voting processor is no longer operational by determining that it has failed to receive from the second voting processor, via the VP group, a corresponding recovered signal calculated by the second voting processor.

18. The communication system of claim 12, wherein the first voting processor is further configured to monitor an infrastructure to voting processor (IF-VP) group for messages directed to base stations and, responsive to detecting that the second voting processor has failed to further transmit a particular infrastructure message transmitted by the infrastructure to the IF-VP group to the base stations via a voting processor to base station (VP-BS) group, the first voting processor transmitting the particular infrastructure message to the base stations via the VP-BS group.

19. The communication system of claim 12, wherein the first voting processor is further configured to transmit a first visibility table to the second voting processor indicating a first set of base stations visible to the first voting processor, and the first voting processor receiving a second visibility table from the second voting processor indicating a second set of base stations visible to the second voting processor.

20. The communication system of claim 19, wherein the first voting processor is further configured to transmit the recovered signal to the voting processor to infrastructure (VP-IN) group associated with an infrastructure device and the first and second voting processors by one of:
 (i) transmitting the recovered signal to a VP-IN multicast address associated with the infrastructure device and the first and second voting processors,
 (ii) transmitting the recovered signal to a broadcast address and including information in one of a header and payload indicating the infrastructure device and the first and second voting processors as intended recipients, and
 (iii) retrieving a list of unicast addresses associated with members of the VP-IN group and transmitting the recovered signal to the each of the infrastructure device and the first and second voting processors via a plurality of respective unicast transmissions to the unicast addresses in the list.

* * * * *